(12) United States Patent
Murofushi

(10) Patent No.: US 10,679,203 B2
(45) Date of Patent: Jun. 9, 2020

(54) RFID TAG READING DEVICE AND PROGRAM

(71) Applicant: TOSHIBA TEC KABUSHIKI KAISHA, Tokyo (JP)

(72) Inventor: Nobuo Murofushi, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 15/642,056

(22) Filed: Jul. 5, 2017

(65) Prior Publication Data

US 2018/0039967 A1 Feb. 8, 2018

(30) Foreign Application Priority Data

Aug. 5, 2016 (JP) .................................. 2016-154712

(51) Int. Cl.
*G06Q 20/20* (2012.01)
*G06K 7/10* (2006.01)
*G07G 1/00* (2006.01)

(52) U.S. Cl.
CPC ....... *G06Q 20/208* (2013.01); *G06K 7/10316* (2013.01); *G06K 7/10376* (2013.01); *G07G 1/009* (2013.01)

(58) Field of Classification Search
CPC ............. G06Q 20/208; G06K 7/10009; G06K 7/10316; G06K 7/10376; G07G 1/009
See application file for complete search history.

(56) References Cited

U.S. PATENT DOCUMENTS 8,061,606 B2 * 11/2011 Barry .................... B01L 3/5453
235/435
2006/0092014 A1 * 5/2006 Onderko ............ G06K 7/10336
340/539.13
2006/0214774 A1 * 9/2006 Mochida .............. G06K 7/0008
340/10.2

(Continued)

FOREIGN PATENT DOCUMENTS

ES 1070967 U 11/2009
JP 2005-157919 A 6/2005
WO 2009/075209 A1 6/2009

OTHER PUBLICATIONS

Extended European Search Report dated Feb. 23, 2018, filed in counterpart European Patent Application No. 17184795.7 (8 pages).

*Primary Examiner* — Florian M Zeender
*Assistant Examiner* — Vanessa Deligi
(74) *Attorney, Agent, or Firm* — Kim & Stewart LLP

(57) ABSTRACT

An electronic tag reading device includes an antenna for transmitting wireless signals to an electronic tag for reading information stored in the electronic tag, an electronic tag reader electrically coupled to the antenna, the electronic tag reader supplying signals to the antenna and receiving signals from the antenna for reading information stored in the electronic tag, and a movable stage connected to the antenna and configured to move the antenna when the antenna is transmitting wireless signals during a tag reading process of the electronic tag reader and stop moving the antenna when the antenna is not transmitting wireless signals during the tag reading process.

15 Claims, 7 Drawing Sheets

(56) References Cited

U.S. PATENT DOCUMENTS

| | | | |
|---|---|---|---|
| 2008/0122623 A1* | 5/2008 | Hause | G06K 17/00 340/572.1 |
| 2009/0015381 A1* | 1/2009 | Mochida | G06K 7/10079 340/10.2 |
| 2009/0171798 A1* | 7/2009 | Sasaki | G06Q 20/204 705/17 |
| 2009/0195358 A1* | 8/2009 | Vennelakanti | G06K 7/0008 340/10.1 |
| 2009/0251292 A1* | 10/2009 | Suzuki | H04W 74/0816 340/10.1 |
| 2010/0271187 A1* | 10/2010 | Uysal | G06K 7/10009 340/10.4 |
| 2015/0302708 A1 | 10/2015 | Hattori | |
| 2016/0127600 A1* | 5/2016 | Beatty | G07G 1/0018 358/1.15 |
| 2017/0126286 A1* | 5/2017 | Oishi | G06K 7/10009 |

* cited by examiner

A ARROW VIEW

RFID TAG READING DEVICE AND PROGRAM

CROSS-REFERENCE TO RELATED APPLICATION

This application is based upon and claims the benefit of priority from Japanese Patent Application No. 2016-154712, filed Aug. 5, 2016, the entire contents of which are incorporated herein by reference.

FIELD

Embodiments described herein relate generally to an RFID tag reading device and a program.

BACKGROUND

In the related art, a radio tag reading device reads information from a radio frequency identification (RFID) tag using an RFID reader with a moving antenna. The RFID tags can be attached to items of merchandise or other commodities for tracking and inventory control.

In a radio tag reading device, a transmission time limit for radio wave emissions may be regulated by law. Therefore, if the position of the antenna moves after the transmission of radio waves has been stopped due to the transmission time limit, there can be a problem in that the reader may miss a portion of its intended reading range and thus certain tags may be missed.

DETAILED DESCRIPTION

In general, according to one embodiment, an electronic tag reading device includes an antenna for transmitting wireless signals to an electronic tag for reading information stored in the electronic tag, an electronic tag reader electrically coupled to the antenna, the electronic tag reader supplying signals to the antenna and receiving signals from the antenna for reading information stored in the electronic tag, and a movable stage connected to the antenna and configured to move the antenna when the antenna is transmitting wireless signals during a tag reading process of the electronic tag reader and stop moving the antenna when the antenna is not transmitting wireless signals during the tag reading process.

(Description of Overall Configuration of Commodity Sales Data Processing Apparatus)

Figure 1:
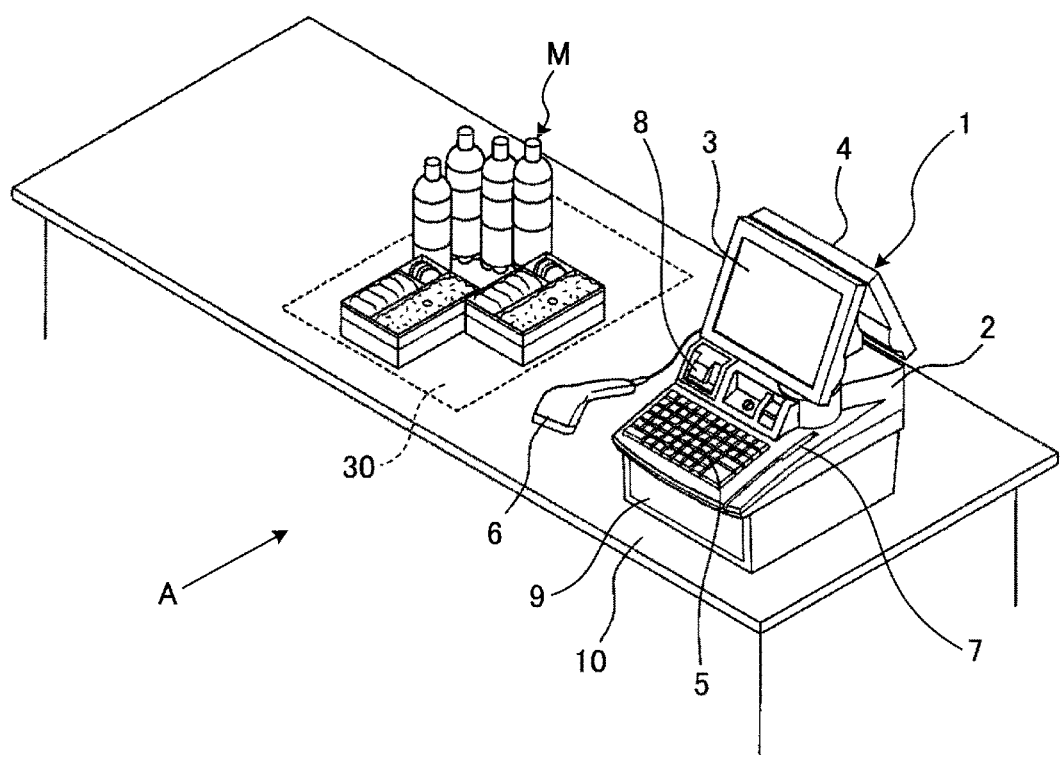
FIG. 1 is an external perspective view of a RFID tag reading device and a commodity sales data processing apparatus.

An RFID tag reading device according to an embodiment will be described below with reference to the drawings. FIG. 1 is an external view illustrating the overall configuration of a commodity sales data processing apparatus 1 equipped with an RFID tag reading device 30. The commodity sales data processing apparatus 1 is installed, for example, in a store such as a supermarket, and used for registration of commodities purchased by customers and the settlement thereof. The RFID tag reading device 30 reads the information of an RFID tag attached to a commodity by using radio waves.

As illustrated in FIG. 1, the commodity sales data processing apparatus 1 includes a point-of-sale (POS) terminal body 2, a sales person-side display 3, a customer-side display 4, a keyboard 5, a barcode reader 6, a card reader 7, a receipt printer 8, and a drawer 9. The commodity sales data processing apparatus 1 is also connected to the RFID tag reading device 30. The configuration of the RFID tag reading device 30 will be described later.

The POS terminal body 2 includes the sales person-side display 3, the customer-side display 4, the keyboard 5, the barcode reader 6, the card reader 7, the receipt printer 8, and the drawer 9. Although not illustrated in detail, the POS terminal body 2 is connected to a store controller (or server) including a commodity database, and can acquire commodity information such as a commodity name, a commodity image, and a commodity unit price corresponding to the commodity code of each commodity read.

The sales person-side display 3 is attached to the upper portion of the POS terminal body 2 towards the inside (the sales person side) of a checkout counter 10. The sales person-side display 3 displays information such as the name and price of the commodity (corresponding to a commodity code read input into the POS terminal body 2. The sales person-side display 3 may have a function of a touch panel that recognizes instructions input by a sales person's pressing of keys or buttons.

The customer-side display 4 is attached toward the outside of the checkout counter 10 (the customer side) with the back surface thereof facing the sales person-side display 3.

The keyboard 5 includes keys such as a closing key for declaring the end of a commodity sales data process of a commodity M purchased by the customer.

The barcode reader 6 optically reads the barcode attached to each commodity M, and is disposed so as to be usable at the center portion of the checkout counter 10. The barcode includes information such as a commodity code which has been previously allocated to each commodity for identifying the type of each commodity. Either of a RFID tag T or a barcode (or both) is affixed to each commodity. Hereinafter, the RFID tag reading device 30, which is a characteristic configuration of the present embodiment, will be described. The description of the barcode reading by the barcode reader 6 will be omitted.

The card reader 7 reads information on a point card (e.g., customer loyalty card) or a credit card inserted in a card insertion slot not illustrated in FIG. 1.

The receipt printer 8 prints a receipt after an accounting process, and issues the receipt from a receipt issue opening not illustrated in FIG. 1.

The drawer 9 includes a drawer capable of opening and closing, and accommodates cash or the like in the drawer.

(Description of Overall Configuration of RFID Tag Reading Device)

Figure 2:
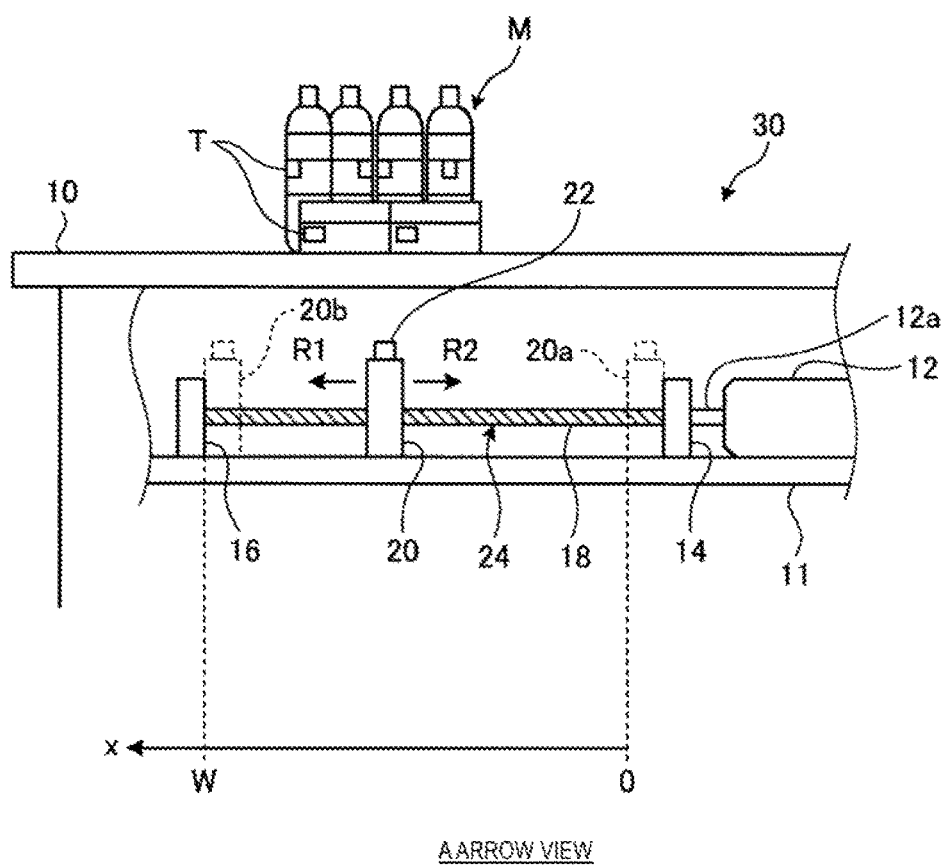
FIG. 2 is a side view illustrating a schematic configuration of the RFID tag reading device.

Next, the configuration of the RFID tag reading device 30 will be described. FIG. 2 is a side view illustrating a schematic configuration of the RFID tag reading device 30 (along the A arrow of FIG. 1).

The RFID tag reading device 30 reads an RFID tag attached to the commodity M, particularly, an RFID tag T operating in the UHF band, in this example. The RFID tag reading device 30 includes an RFID antenna 22. As illustrated in FIG. 2, the RFID antenna 22 is embedded in the checkout counter 10.

In FIG. 2, the RFID antenna 22 radiates radio waves toward a top plate of the checkout counter 10. The top plate is made of a material that transmits radio waves, such as wood. A communication area of the RFID tag reading device 30 corresponds to region/area that can receive radio waves transmitted by the RFID antenna 22. The RFID antenna 22 reads the tag information stored in the RFID tags T attached to the commodities M placed in the reading area. As illustrated in FIG. 1, the commodity M being purchased by the customer is placed on the checkout counter 10 directly above the RFID antenna 22. Alternatively, a shopping basket (not specifically depicted) containing the commodity M may be placed above the RFID antenna 22. In addition, information, such as the commodity code of the commodity to which the RFID tag T is attached, is stored in the RFID tag T in advance along with identification information unique to the tag.

The RFID antenna 22 is installed on a moving mechanism 24 disposed under the checkout counter 10. The RFID antenna so installed is thus movable below the top plate of the checkout counter 10.

The moving mechanism 24 is configured with a linear motion mechanism including a screw shaft 18, a bearing 16 of the screw shaft 18, a stepping motor 12, a coupling 14, and a moving stage 20. The stepping motor 12 is a rotational power source. The coupling 14 transmits the rotational power of the stepping motor 12 to the screw shaft 18. The moving stage 20 is formed integrally with a ball screw nut screwed to the screw shaft 18.

One end of the screw shaft 18 is horizontally supported by the bearing 16 and the other end by the coupling 14 so as to be rotatable about a horizontal axis (x-axis in FIG. 2). An output shaft 12*a* of the stepping motor 12 is connected to the other end of the screw shaft 18 in the coupling 14. With this configuration, the rotational power of the stepping motor 12 is transmitted from the output shaft 12*a* to the screw shaft 18 through the coupling 14.

The moving stage 20 has a through hole, and the ball screw nut of the screw shaft 18 is embedded in the through hole. The moving stage 20 moves forward and backward along the screw shaft 18, that is, moves in the directions of the arrow R1 and the arrow R2 along the x axis in FIG. 2. Since a metallic ball (e.g., steel ball) is interposed in the threaded portion between the screw shaft 18 and the ball screw nut during the movement of the moving stage 20, smooth movement is possible. It is assumed that the moving stage 20 moves in the range of x=0 to x=W along the x axis as illustrated in FIG. 2. That is, the moving stage 20 moves between the rightmost position 20*a* and the leftmost position 20*b*.

As described above, the moving mechanism 24 changes the rotational motion of the stepping motor 12 to a linear motion by the above-described ball screw mechanism to enable the moving stage 20 to move forward and backward. The moving stage 20 slides while keeping a part of the moving stage 20 in contact with the support plate 11 such that the moving stage 20 does not rotate along with the rotation of the screw shaft 18. Thus, the moving stage 20 moves without rotating.

On the upper surface of the moving stage 20, the RFID antenna 22 is fixed so that a reading surface of the RFID antenna 22 is facing the top plate of the checkout counter 10. Here, the reading surface of the RFID antenna 22 refers to a radiation surface from which a planar patch antenna radiates radio waves. With this disposition, the RFID antenna 22 radiates radio waves of a high intensity toward the reading surface, that is, toward the top plate of the checkout counter 10. Then, the RFID antenna 22 moves along the screw shaft 18 integrally with the moving stage 20.

A reader and writer device (not illustrated) can be connected to the RFID antenna 22 using a bendable coaxial cable. To improve the positioning accuracy of the moving stage 20, the reader and writer device may be provided with a position sensor 42 (see FIG. 3) disposed along the path of the moving stage 20. The position sensor 42 can be used to correct the position of the moving stage 20. For example, the reader and writer device is provided with a position sensor 42 (for example, a micro switch, a proximity sensor, or the like) at a start position and an end position of the moving stage 20, and acts to stop the movement of the moving stage 20 or corrects the movement amount of the moving stage 20 when the position sensor 42 detects the position of the moving stage 20 is incorrect. Thus, the reader and writer device can more reliably perform positioning of the moving stage 20 and the thus positioning of the RFID antenna 22.

With the configuration of the moving mechanism 24 described above, if the stepping motor 12 is rotated in one direction, the moving stage 20 advances on the screw shaft 18 in the direction of the arrow R1 in FIG. 2, and if the stepping motor 12 rotates in the reverse direction, the moving stage 20 moves on the screw shaft 18 in the direction of the arrow R2 in FIG. 2. Along with the movement of the moving stage 20, the RFID antenna 22 moves integrally with the moving stage 20 with the reading surface facing upward (towards the top plate of the checkout counter 10). With this movement, the RFID antenna 22 communicates with the RFID tag T while changing the communication range with the RFID tag T.

(Description of Hardware Configuration of an Example)

Figure 3:
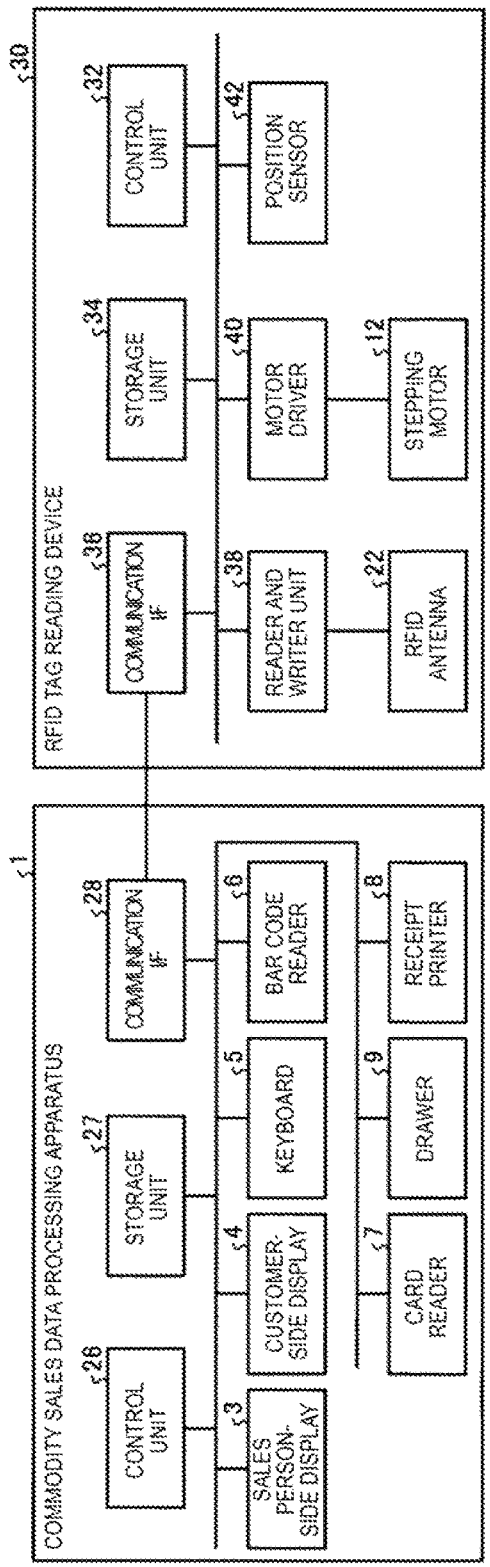
FIG. 3 is a block diagram illustrating hardware aspects of a commodity sales data processing apparatus and a RFID tag reading device.

Next, the configurations of the commodity sales data processing apparatus 1 and the RFID tag reading device 30 will be described. FIG. 3 is a hardware block diagram illustrating aspects of hardware configurations of the commodity sales data processing apparatus 1 and the RFID tag reading device 30 in the present embodiment.

The commodity sales data processing apparatus 1 includes a control unit 26 such as a computer including a central processing unit (CPU), a read only memory (ROM), a random access memory (RAM), and the like. The ROM stores various programs executed by the CPU and various types of data. The RAM temporarily stores data and programs when the CPU executes various programs.

The control unit 26 is connected to the sales person-side display 3, the customer-side display 4, the keyboard 5, the barcode reader 6, the card reader 7, the drawer 9 and the receipt printer 8 through various input and output (I/O) circuits. The function of each hardware unit is as described above.

Furthermore, a storage unit 27 and a communication interface (I/F) 28 are connected to the control unit 26.

The storage unit 27 is a storage device including a nonvolatile storage medium, such as a hard disk drive (HDD) or a solid state drive (SSD). The storage unit 27 stores various programs and various types of data related to the operation of the commodity sales data processing apparatus 1. Examples of the data stored in the storage unit 27 include a commodity master list registering commodity information on each possible commodity M in association with a commodity code identifying the commodity M. Such commodity information includes, for example, the commodity name, the price, and the like of the corresponding commodity M. The communication I/F 28 is an interface for transmitting to and receiving from the RFID tag reading device 30 various types of data.

The RFID tag reading device 30 includes a control unit 32 such as a computer configuration including a CPU, a ROM, a RAM, and the like. The ROM stores various programs executed by the CPU and various types of data. The RAM temporarily stores data and programs when the CPU executes various programs.

Furthermore, the control unit 32 is connected to a reader and writer unit 38, a storage unit 34, a communication interface (I/F) 36, a motor driver 40, a position sensor 42, and the like through various input and output circuits.

The reader and writer unit 38 communicates with the RFID tag T through the RFID antenna 22 under the instruction from the control unit 32. The communication with the RFID tag T is generally performed as in the following example.

If the RFID tag T is, for example, a passive type that does not have a battery, the RFID antenna 22 radiates a high-frequency signal output (e.g., an inquiry signal) supplied from the reader and writer unit 38 as radio waves. Then, in response to the interrogation waves, the RFID antenna 22 receives a response signal including tag information, such as an identification code, modulated (e.g., encoded) in the reflected radio wave, from an RFID tag T existing within the communication range of the RFID tag reading device. The RFID antenna 22 sends the received radio waves to the reader and writer unit 38, and the reader and writer unit 38 demodulates the received high frequency signal, and then transmits the demodulated tag information to the control unit 32. Thus, the RFID tag reading device 30 can read the tag information stored in the RFID tag T.

The storage unit 34 is a storage device including a nonvolatile storage medium such as an HDD or an SSD. The storage unit 34 stores various programs and various types of data related to the operation of the RFID tag reading device 30. The communication I/F 36 is an interface for transmitting and receiving various types of data to and from the commodity sales data processing apparatus 1.

The motor driver 40 is a driver circuit that operates the stepping motor 12. The motor driver 40 outputs a pulse signal for rotating the stepping motor 12 by a predetermined angle (e.g., step angle) based on an instruction from the control unit 32.

The position sensor 42 detects whether or not the moving stage 20 is at a predetermined position, as described above.

(Description of Functional Configuration)

Figure 4:
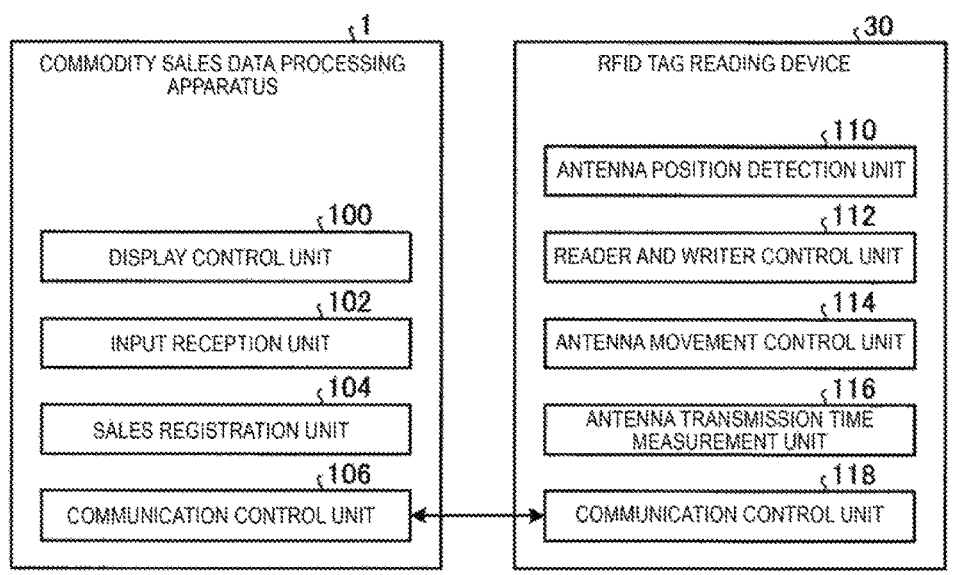
FIG. 4 is a block diagram illustrating functional aspects of a commodity sales data processing apparatus and a RFID tag reading device.

Next, the functional aspects of configurations of the commodity sales data processing apparatus 1 and the RFID tag reading device 30 will be described. FIG. 4 is a block diagram illustrating functional aspects of the commodity sales data processing apparatus 1 and the RFID tag reading device 30.

The control unit 26 (CPU) of the commodity sales data processing apparatus 1 cooperates with a program stored in the storage unit 27 to realize the display control unit 100, the input reception unit 102, the sales registration unit 104, and the communication control unit 106 as functional units.

The display control unit 100 controls the sales person-side display 3 so as to display various screens on the sales person-side display 3. For example, the display control unit 100 displays a screen including a button, an icon, or the like for instructing the start of the reading of the commodity code (also referred to as a reading start button) and a button, an icon, or the like for instructing to the end of the reading (also referred to as a reading end button). Further, the display control unit 100 reads the commodity information corresponding to the commodity code from the commodity master list, based on the commodity code transmitted from the RFID tag reading device 30, and displays the commodity name and price of the commodity M, the tendered amount, the change due amount, and the like on the sales person-side display 3. Further, the display control unit 100 controls the customer-side display 4 so as to display various screens on the customer-side display 4. For example, the display control unit 100 displays the commodity name, the price, and the like of the commodity M being purchased by the customer on both the sales person-side display 3 and the customer-side display 4, based on the commodity code transmitted from the RFID tag reading device 30.

The input reception unit 102 receives an input through the keyboard 5 or the touch panel. For example, if a button or key is pressed on the operation screen displayed on the sales person-side display 3, the input reception unit 102 outputs an instruction corresponding to the pressed button or key to the control unit 26.

When the payment is confirmed upon settlement for each of commodities M corresponding to the commodity codes transmitted from the RFID tag reading device 30, the sales registration unit 104 registers the sales of the commodities purchased by the customer. Specifically, the sales registration unit 104 registers the commodity code of each commodity M in the database for registration together with the tendered amount, change due, and transaction date and time. The database for registration may be provided in the storage unit 27 of the commodity sales data processing apparatus 1 or may be provided in an external device capable of communicating with the commodity sales data processing apparatus 1.

The communication control unit 106 controls the communication I/F 28, and transmits and receives various types of information to and from the RFID tag reading device 30 through the communication I/F 28. For example, if the reading start button is pressed, the communication control unit 106 transmits instruction information for instructing the start of the reading to the RFID tag reading device 30. Furthermore, the communication control unit 106 receives the commodity code transmitted from the RFID tag reading device 30. If the reading end button is pressed, the communication control unit 106 transmits instruction information for instructing the ending of the reading to the RFID tag reading device 30.

The control unit 32 (CPU) of the RFID tag reading device 30 cooperates with the program stored in the storage unit 34 to realize an antenna position detection unit 110, a reader and writer control unit 112, an antenna movement control unit 114, an antenna transmission time measurement unit 116, and a communication control unit 118 as functional units.

The reader and writer control unit 112 controls the reader and writer unit 38 so as to perform reading of the RFID tags T (attached to the commodities M) and performs writing to the RFID tags T through the RFID antenna 22.

Specifically, the reader and writer control unit 112 starts a reading cycle for reading the RFID tag T, when the start of reading is instructed from the commodity sales data processing apparatus 1. The tag information (a commodity code in this case) read from the RFID tag T is transmitted to the commodity sales data processing apparatus 1 from the reader and writer control unit 112 at any time during or after the reading.

Further, when the end of reading is instructed from the commodity sales data processing apparatus 1, the reader and writer control unit 112 ends the reading by the reader and writer unit 38. Then, when a registration completion is instructed from the commodity sales data processing apparatus 1, the reader and writer control unit 112 controls the reader and writer unit 38 and performs a writing (writing cycle) of the registration completion flag. Here, the registration completion flag is information indicating that the sales registration has been completed for the particular RFID tag(s) T. The completion flag is written to a predetermined storage area of each RFID tag T.

The antenna position detection unit 110 receives an instruction from the control unit 32 and monitors the output of the position sensor 42. Then, the antenna position detection unit 110 determines whether or not the moving stage 20 is at a predetermined position. The antenna position detection unit 110 further passes the output of the position sensor 42 to the control unit 32.

The antenna movement control unit 114 controls the motor driver 40 when reading the RFID tag T. Specifically, during the execution of reading of the RFID tag T by the reader and writer control unit 112, the antenna movement control unit 114 drives the motor driver 40 according to a predetermined operation pattern. Specifically, the antenna movement control unit 114 acquires information on the position of the moving stage 20 detected by the antenna position detection unit 110, and moves the moving stage 20, that is, the RFID antenna 22 according to the predetermined operation pattern. For example, the predetermined operation pattern may be reciprocating the moving stage 20 between stage positions x=0 and x=W (see FIG. 2).

The antenna transmission time measurement unit 116 measures the time for which the RFID antenna 22 transmits radio waves.

The communication control unit 118 controls the communication I/F 36, and transmits and receives various types of information to and from the commodity sales data processing apparatus 1 through the communication I/F 36. For example, the communication control unit 118 receives the start reading instruction which is transmitted from the commodity sales data processing apparatus 1. The communication control unit 118 also transmits the commodity code read from the RFID tag T (by the reader and writer control unit 112) to the commodity sales data processing apparatus 1. In addition, the communication control unit 118 receives the instruction to end reading, which is transmitted from the commodity sales data processing apparatus 1.

(Description of Relationship Between Radio Wave Transmission Operation and Operation of Antenna Movement Control Unit)

Figure 5:
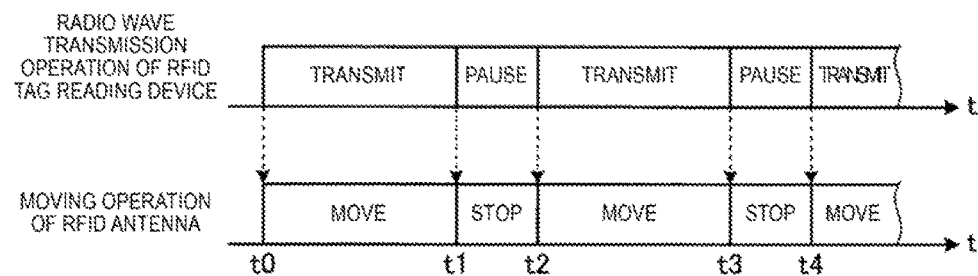
FIG. 5 is a timing chart illustrating a relationship between a radio wave transmission operation of the RFID tag reading device and a moving operation of the RFID antenna.

Next, a relationship between the radio wave transmission operation performed by the RFID tag reading device 30 (the reader and writer control unit 112) and the operation of the antenna movement control unit 114 will be described with reference to FIG. 5. FIG. 5 is a timing chart illustrating the relationship between the radio wave transmission operation of the RFID tag reading device 30 (the reader and writer control unit 112) and the moving operation of the RFID antenna 22 according to the instruction of the antenna movement control unit 114.

At time t=t0, the RFID tag reading device 30 instructs the RFID antenna 22 to start transmission of radio waves. The RFID antenna 22 receives the instruction from the RFID tag reading device 30, and starts transmitting radio waves.

The antenna movement control unit 114 starts the movement of the moving stage 20 at time t=t0.

The RFID tag reading device 30 pauses transmission of radio waves at time t=t1. There may be legal restrictions on the continuous transmission time of radio waves. That is, governmental regulations may limit the permissible length of time (e.g., t0 to t1) for continuous emissions of radio waves from time RFID tag reading device 30 to be shorter than some time period. According to certain radio equipment governmental regulations, a transmission time limit for a device incorporating radio equipment such as a local wireless emitter using radio waves with frequencies between 916.7 MHz and 920.9 MHz must stop emission of radio waves within 4 seconds after the local wireless station begins its emission of radio waves. Furthermore, it is prescribed that emissions are not restarted until the elapse of 50 ms from the stop (Article 49-9 of the equipment regulations). In accordance with this governmental rule, in FIG. 5, t1−t0<4 seconds (s) and t2−t1>50 milliseconds (ms) are set as regulation compliant examples.

The antenna movement control unit 114 stops the movement of the moving stage 20 at time t=t1. That is, when the RFID antenna 22 pauses the transmission of radio waves, the movement of the RFID antenna 22 is stopped.

The RFID tag reading device 30 instructs the RFID antenna 22 to start transmission of radio waves at time t=t2 (t2>t1+50 ms). The RFID antenna 22 receives the instruction from the RFID tag reading device 30, and starts transmitting radio waves.

The antenna movement control unit 114 starts the movement of the moving stage 20 at time t=t2. Thereafter, the RFID tag reading device 30 and the antenna movement control unit 114 repeat substantially the same operation. That is, in FIG. 5, t3−t2<4 s and t4−t3>50 ms are set.

As described above, the reader and writer control unit 112 and the antenna movement control unit 114 cooperate to move the RFID antenna 22 only during a transmission period in which the RFID antenna 22 actively transmits radio waves. Then, during a transmission pause in which the RFID antenna 22 does not transmit radio waves, the RFID antenna 22 is not moved.

Figure 6:
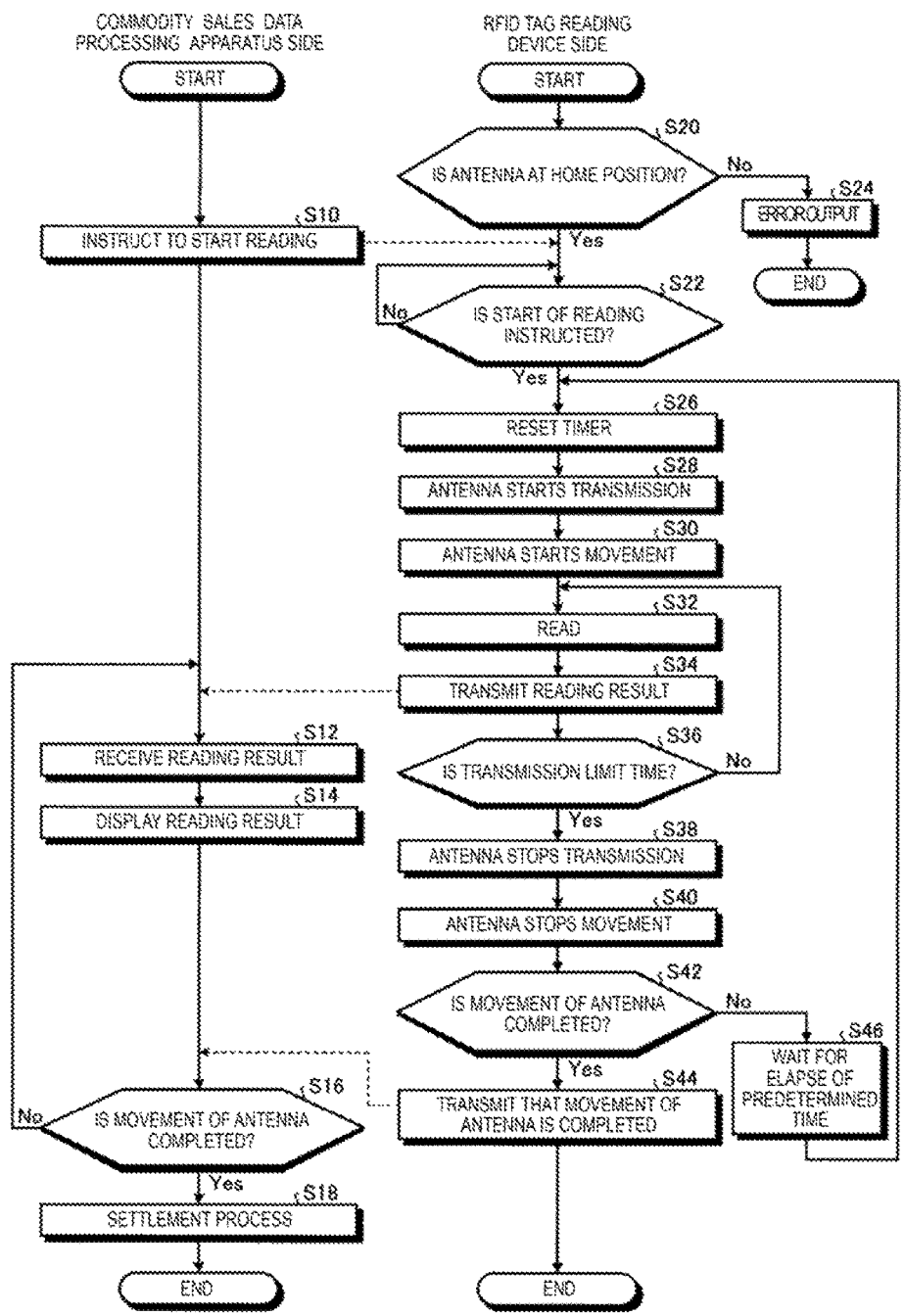
FIG. 6 is a flowchart illustrating aspects of a process of an RFID tag reading that can be performed by the commodity sales data processing apparatus and the RFID tag reading device.

Next, the flow of a series of processes performed by the commodity sales data processing apparatus 1 and the RFID tag reading device 30 will be described with reference to FIG. 6. FIG. 6 is a flowchart illustrating a flow of a reading of the RFID tag T that is performed by the commodity sales data processing apparatus 1 and the RFID tag reading device 30.

(Description of Flow of Process Performed by Commodity Sales Data Processing Apparatus)

First, a flow of a process performed by the commodity sales data processing apparatus 1 will be described. The sales person instructs the input reception unit 102 of the commodity sales data processing apparatus 1 to start reading the RFID tag T (Act S10). Specifically, the sales person places the commodity M on the checkout counter 10 and instructs to start reading the RFID tag T by operating the keyboard 5 or the button or the like for instructing to start reading the RFID tag T displayed on the sales person-side display 3 provided with the touch panel function.

The communication control unit 106 receives the reading result of the RFID tag T from the RFID tag reading device 30 (Act S12).

The display control unit 100 displays the reading result of the RFID tag T on the sales person-side display 3 and the customer-side display 4 (Act S14).

The commodity sales data processing apparatus 1 determines whether or not the movement of the RFID antenna 22 has been completed (Act S16). When the commodity sales data processing apparatus 1 determines that the movement of the RFID antenna 22 is completed (Act S16: Yes), the process proceeds to Act S18. Otherwise (Act S16: No), the process returns to Act S12.

The sales registration unit 104 performs settlement (Act S18). Thereafter, the commodity sales data processing apparatus 1 ends the process of FIG. 6.

(Description of Flow of Process Performed by RFID Tag Reading Device)

Next, the flow of the process performed by the RFID tag reading device 30 will be described. First, with reference to the output of the position sensor 42, the antenna position detection unit 110 determines whether or not the RFID antenna 22 is at a position of, for example, x=0, that is, at a home position (Act S20). When the antenna position detection unit 110 determines that the RFID antenna 22 is at the home position (Act S20: Yes), the process proceeds to Act S22. Otherwise (Act S20: No), the process proceeds to Act S24.

The RFID tag reading device 30 displays an error output (Act S24). The error output may be displayed on, for example, the sales person-side display 3. Thereafter, the process of FIG. 6 is ended.

In Act S20, if it is determined that the RFID antenna 22 is at the home position (Act S20: Yes), the RFID tag reading device 30 determines whether or not the start of reading of the RFID tag T has been instructed from the commodity sales data processing apparatus 1 (Act S22). If the RFID tag reading device 30 determines that the start of reading of the RFID tag T is instructed (Act S22: Yes), the process proceeds to Act S26. Otherwise (Act S22: No), the process of Act S22 is repeated.

The antenna transmission time measurement unit 116 resets a timer that measures the time during which the RFID antenna 22 is transmitting radio waves (Act S26).

The RFID antenna 22 receives the instruction from the reader and writer control unit 112, and starts transmitting the radio wave (Act S28).

If the transmission of the radio waves is started, the antenna movement control unit 114 sets the moving speed of the RFID antenna 22 to a predetermined value and starts the movement of the RFID antenna 22 (Act S30). In addition, the RFID antenna 22 reciprocates a predetermined number of times between the position of x=0 and the position of x=W (illustrated in FIG. 2).

The reader and writer control unit 112 reads the information of the RFID tag T by receiving the reflected wave of the radio wave radiated by the RFID antenna 22 (Act S32).

The communication control unit 118 transmits the information of the RFID tag T read by the reader and writer control unit 112 to the communication control unit 106 of the commodity sales data processing apparatus 1 (Act S34).

The antenna transmission time measurement unit 116 determines whether or not the transmission time of the radio wave of the RFID antenna 22 reaches a predetermined limit time (for example, 4 seconds) (Act S36). When the radio wave transmission time reaches the predetermined limit time (Act S36: Yes), the process proceeds to Act S38. Otherwise (Act S36: No), the process returns to Act S32.

The reader and writer control unit 112 stops the transmission of radio waves from the RFID antenna 22 (Act S38).

When the transmission of the radio wave is stopped, the antenna movement control unit 114 stops the movement of the RFID antenna 22 (Act S40).

The antenna movement control unit 114 determines whether or not the movement of the RFID antenna 22 is completed (Act S42). When the movement of the RFID antenna 22 is completed (Act S42: Yes), the process proceeds to Act S44. Otherwise (Act S42: No), the process proceeds to Act S46.

The RFID tag reading device 30 transmits to the commodity sales data processing apparatus 1 through the communication control unit 118 that the movement of the RFID antenna 22 is completed (Act S44). Thereafter, the process of FIG. 6 is ended.

In Act S42, if it is determined that the movement of the RFID antenna 22 has not been completed (Act S42: No), the antenna transmission time measurement unit 116 waits for the elapse of a predetermined time (for example, 50 ms) (Act S46). After the elapse of the predetermined time, the process returns to Act S26.

DESCRIPTION OF FIRST MODIFICATION OF EMBODIMENT

Hereinafter, a modification of the embodiment will be described. In the embodiment described above, the transmission of radio waves is temporarily stopped when the radio wave transmission time of the RFID antenna 22 reaches a predetermined time limit (e.g., 4 seconds). The movement of the RFID antenna 22 is stopped while the transmission of the radio wave is stopped. In a modification to be described below, it is assumed that a transmission period during which the RFID antenna 22 transmits radio waves is a period from a time when the RFID antenna 22 starts transmitting inquiry signals, encoded in interrogation radio waves to a time when the reader and writer control unit 112 receives the response signal to the last inquiry signal for the RFID tag T from the RFID tag T.

This modification has substantially the same hardware configuration (e.g., FIG. 3) as the commodity sales data processing apparatus 1 provided with the RFID tag reading device 30 described above. However, in this modification, the content of program stored in the storage unit 34 of the RFID tag reading device 30 is different. In order to distinguish from the above-described embodiment, the RFID tag reading device in this modification is referred to as an RFID tag reading device 30a. Since the hardware configuration is substantially the same, the respective units in the modification will be described using the same reference numerals as in the above-described embodiment.

The functional configuration of the modification is also similar to that of the functional blocks illustrated in FIG. 4. However, the content of the control executed by the reader and writer control unit 112 is somewhat different. Therefore, a description is made assuming that the RFID tag reading device 30a has a reader and writer control unit 112a.

Figure 7:
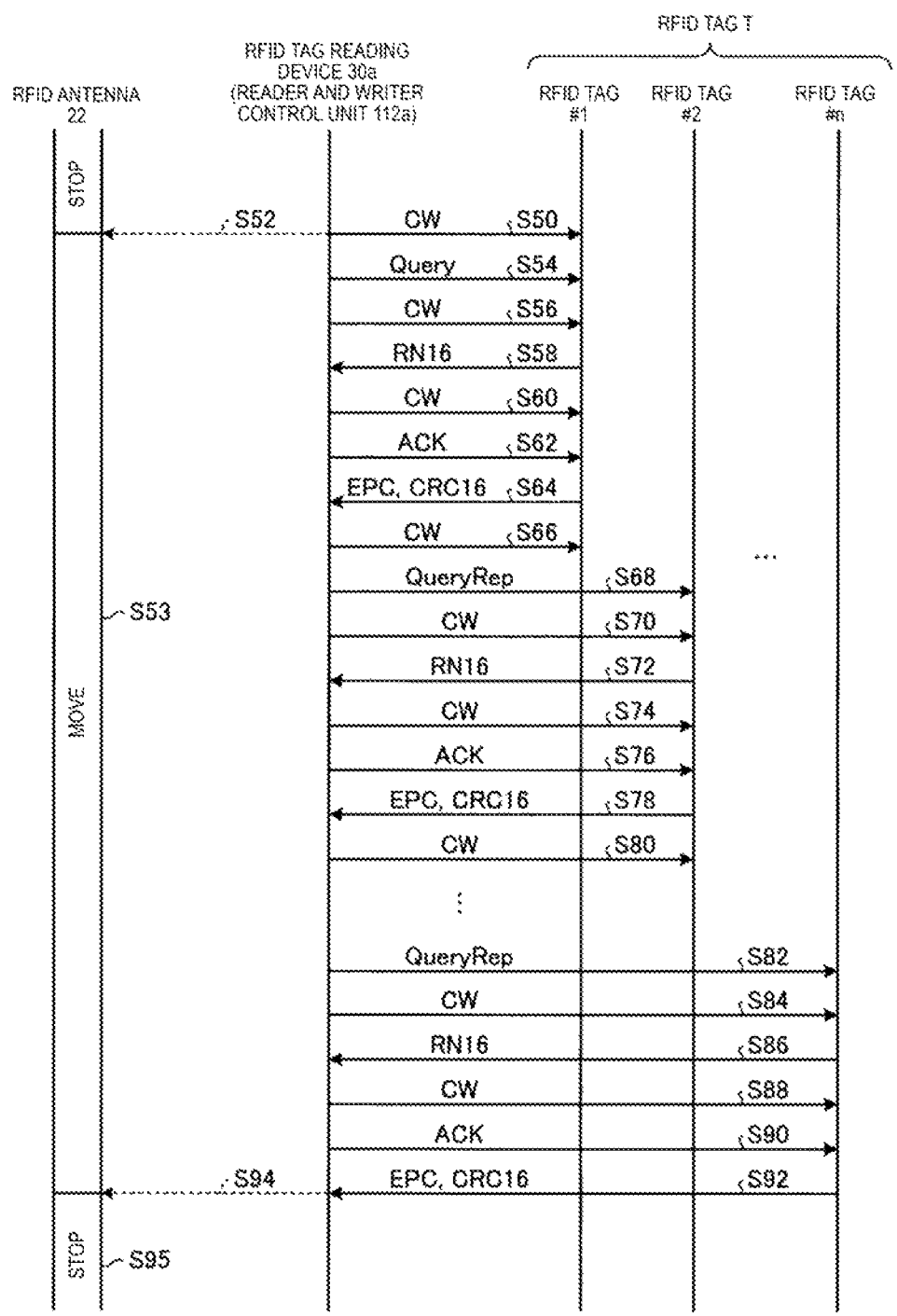
FIG. 7 is simplified sequence diagram illustrating an example of an RFID tag reading in a first modification of an embodiment.

FIG. 7 is a sequence diagram illustrating a simplified series of flows of the reading of the RFID tag T performed by the RFID tag reading device 30a. Here, in order to make it easy to understand the exchange of information between the RFID antenna 22, the RFID tag reading device 30a, and the RFID tag T, a description will be made using a simplified sequence diagram instead of a flowchart.

It is assumed that n commodities M (n=arbitrary positive integer value) to which the RFID tags T are attached are placed on the checkout counter 10 (FIG. 1). That is, it is assumed that the RFID tag reading device 30a is to read the information of n total RFID tags T.

It is assumed that the RFID tag reading device 30a reads the information of the RFID tags T according to a predetermined protocol (e.g., EPCglobal Class 1 Generation 2).

In addition, the reader and writer control unit 112a of the RFID tag reading device 30a transmits to the RFID tags T, a modulated wave for communicating with the RFID tag T and a non-modulated wave (hereinafter referred to as a continuous wave CW) for supplying power to the RFID tags T such that the RFID tags T can respond to the modulated wave.

The reader and writer control unit 112a transmits the continuous wave CW to the RFID tag T (Act S50). This Act S50 serves as the starting point of the radio wave transmission start time. While in FIG. 7, it is depicted that the continuous wave CW is transmitted only to the RFID tag #1 at an initial time; however, the continuous wave CW is transmitted to all the RFID tags T at once. This also applies to the other transmissions of the continuous wave CW to be described below.

The reader and writer control unit 112a of the RFID tag reading device 30a instructs the antenna movement control unit 114 to start movement of the RFID antenna 22 (Act S52).

The stepping motor 12 starts rotating in response to the instruction of Act S52. Then, the RFID antenna 22 starts to move (Act S53).

The reader and writer control unit 112a first transmits a search signal Query for searching the RFID tag T to the RFID tag T (Act S54).

The reader and writer control unit 112a transmits the continuous wave CW to the RFID tag T (Act S56).

Upon receiving the search signal Query, the RFID tag T transmits a random number signal RN 16 generated by the RFID tag T to the RFID tag reading device 30a (Act S58). In the example of FIG. 7, it is assumed that RFID tag #1 is the tag that responds. The random number signal RN 16 is a 16-*bit* random number used when the RFID tag T communicates with the reader and writer control unit 112a. When a plurality of RFID tags T simultaneously return responses with the random number signal RN 16, there is a possibility that signal collision occurs in the reader and writer control unit 112a and information cannot be read. Therefore, when communicating with the RFID tag T, the RFID tag reading device 30a designates a specific bit as a time slot, and the RFID tag T shifts the response timing according to the data of the time slot. Such a function is referred to as an anti-collision function.

The reader and writer control unit 112a transmits the continuous wave CW to the RFID tag T (Act S60).

Upon receiving the random number signal RN 16, the reader and writer control unit 112a transmits an acknowledgment signal ACK with the received random number signal RN 16 to the RFID tag #1 (Act S62).

If the random number signal RN 16 transmitted by the RFID tag #1 and the random number signal RN 16 with the acknowledgment signal ACK match, the RFID tag #1 receiving the acknowledgment signal ACK transmits a response signal electronic product code (EPC) and an error detection signal cyclic redundancy check 16 (CRC 16) to the reader and writer control unit 112a (Act S64). The response signal EPC is an identification code, written in the RFID tag T, that can uniquely identify the commodity M. The error detection signal CRC 16 is a type of error detection code and is mainly used for detecting accidental errors caused by the data transfer process or the like.

The reader and writer control unit 112a transmits the continuous wave CW to the RFID tag T (Act S66).

If there is no abnormality in the check result of the received error detection signal CRC 16, the reader and writer control unit 112a transmits an inquiry signal QueryRep to the RFID tags #2 to # n other than the RFID tag #1 (Act S68). The inquiry signal QueryRep is transmitted to the RFID tag T other than the RFID tag #1 that has already transmitted the random number signal RN 16. FIG. 7 illustrates an example in which the RFID tag #2 receives the inquiry signal QueryRep.

The reader and writer control unit 112a transmits the continuous wave CW to the RFID tag T (Act S70).

Upon receiving the inquiry signal QueryRep, the RFID tag #2 transmits the random number signal RN 16 generated by the RFID tag #2 to the RFID tag reading device 30a (Act S72).

Thereafter, the reader and writer control unit 112a of the RFID tag reading device 30a performs substantially the same series of reading processes (Acts S74 to S80) for the RFID tag #2 as previously performed between the reader and writer control unit 112a and the RFID tag #1 (Acts S60 to S66). Thereafter, the reader and writer control unit 112a performs the reading for each RFID tag T using substantially the same procedure.

As such, the reader and writer control unit 112a eventually transmits an inquiry signal QueryRep to any RFID tag # n that is a remaining, unread RFID tag T (Act S82).

Thus, the reader and writer control unit 112a transmits the continuous wave CW to the RFID tag T (Act S84).

Upon receiving the inquiry signal QueryRep, the RFID tag # n transmits the random number signal RN 16 generated by the RFID tag # n to the RFID tag reading device 30a (Act S86).

The reader and writer control unit 112a transmits the continuous wave CW to the RFID tag T (Act S88).

Upon receiving the random number signal RN 16, the reader and writer control unit 112a transmits an acknowledgment signal ACK with the received random number signal RN 16 as an argument, to the RFID tag # n (Act S90).

If the random number signal RN 16 transmitted by the RFID tag # n and the random number signal RN 16 with the acknowledgment signal ACK match, the RFID tag # n receiving the acknowledgment signal ACK transmits a response signal EPC and an error detection signal CRC 16 to the reader and writer control unit 112a (Act S92).

After the reading for all the RFID tags T is completed, the reader and writer control unit 112a instructs the antenna movement control unit 114 to stop the movement of the RFID antenna 22 (Act S94).

The stepping motor 12 stops rotating in response to the instruction of Act S94. Then, the RFID antenna 22 stops moving (Act S95).

In FIG. 7, if the total number (n) of RFID tags T is large, the time required for reading all the RFID tags T may be large. Therefore, there is a possibility that the transmission time of radio waves from the RFID antenna 22 reaches a limit on the time for which continuous transmission is permitted. Therefore, while performing the series of reading illustrated in FIG. 7, as described in the above embodiment, it is desirable that the antenna transmission time measurement unit 116 (FIG. 4) determines whether or not the continuous transmission time has reached the predetermined limit time. If a continuous transmission time of the radio waves reaches the predetermined time, the transmission of the radio waves is stopped, and the transmission of the radio waves is re-started again after the elapse of the predetermined stop time (e.g., pause time period in FIG. 5).

DESCRIPTION OF SECOND MODIFICATION OF EMBODIMENT

In a second modification to be described below, it is assumed that the period during which the RFID antenna 22 transmits radio waves is a period starting when the RFID antenna 22 starts transmitting radio waves and ending when the reader and writer control unit 112 determines that a response signal EPC to an inquiry signal QueryRep for at least one RFID tag T has not been obtained after a predetermined timeout time To.

The second modification has the substantially same hardware configuration (FIG. 3) as the commodity sales data processing apparatus 1 provided with the RFID tag reading device 30 described above. However, in the second modification, the content of program stored in the storage unit 34 of the RFID tag reading device 30 is different. In order to distinguish from the above-described embodiment and the first modification, a RFID tag reading device of the second modification is referred to as an RFID tag reading device 30b. Since the hardware configuration is substantially the same, the respective units corresponding to the second modification will be described using the same reference numerals as in the above-described embodiment and the first modification.

The functional configuration of the second modification is also substantially the same as that of the functional block illustrated in FIG. 4. In general, only the content of the control program executed by the reader and writer control unit 112 is different. Therefore, a description is made assuming that the RFID tag reading device 30b has a reader and writer control unit 112b.

Figure 8:
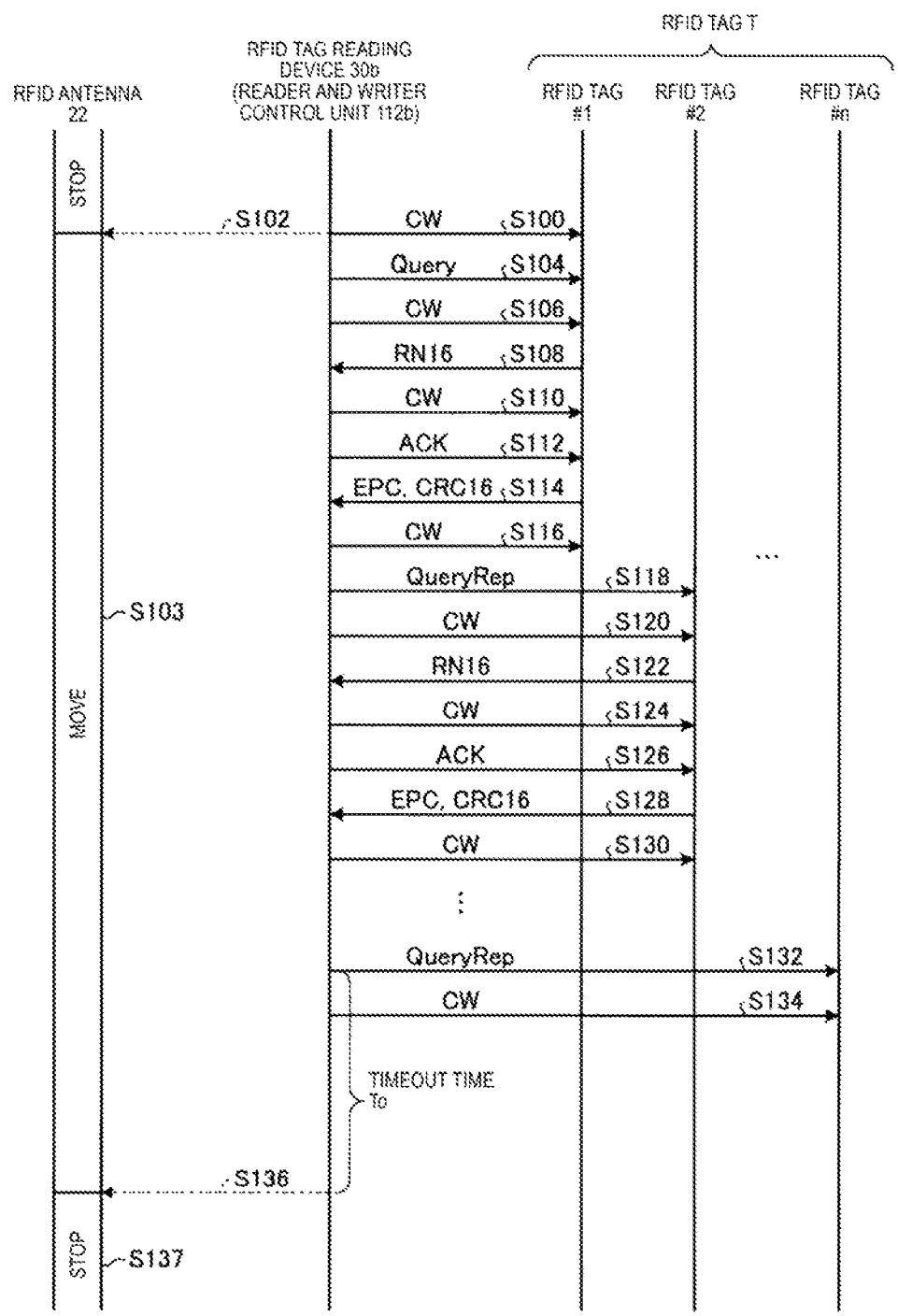
FIG. 8 is simplified sequence diagram illustrating an example of an RFID tag reading in a second modification of an embodiment.

FIG. 8 is a simplified sequence diagram illustrating a series of flows of the reading of the RFID tag T performed by the RFID tag reading device 30b in a commodity sales data processing apparatus 1. Here, in order to make it easy to understand the exchange of information between the RFID antenna 22, the RFID tag reading device 30b, and the RFID tag T, a description will be made using a simplified sequence diagram instead of a flowchart.

It is assumed that n commodities M to which the RFID tags T are attached are placed on the checkout counter 10 (see e.g., FIG. 1). That is, it is assumed that the RFID tag reading device 30b reads the information of n RFID tags T. It is assumed that the RFID tag reading device 30b reads the information of the RFID tags T by the same protocol as used in the first modification.

The reader and writer control unit 112b transmits the continuous wave CW to the RFID tag T (Act S100). The following description is made assuming that the transmitted continuous wave CW is being received by the RFID tag #1.

The reader and writer control unit 112b instructs the antenna movement control unit 114 to start movement of the RFID antenna 22 (Act S102).

The stepping motor 12 starts rotating in response to the instruction of Act S102. Then, the RFID antenna 22 starts moving (Act S103).

The reader and writer control unit 112b first transmits a search signal Query to the RFID tags T (Act S104).

The reader and writer control unit 112b transmits the continuous wave CW to the RFID tags T (Act S106).

Upon receiving the search signal Query, each RFID tag T transmits a random number signal RN 16 generated by the respective RFID tag T to the RFID tag reading device 30b (Act S108). In the example of FIG. 8, it is assumed that RFID tag #1 responds to this initial query.

The reader and writer control unit 112b transmits the continuous wave CW to the RFID tags T (Act S110).

Upon receiving the random number signal RN 16, the reader and writer control unit 112b transmits an acknowledgment signal ACK with the received random number signal RN 16 to the RFID tag #1 (Act S112).

If the random number signal RN 16 transmitted by the RFID tag #1 and the random number signal RN 16 included with the acknowledgment signal ACK match, the RFID tag #1 receiving the acknowledgment signal ACK transmits a response signal EPC and an error detection signal CRC 16 to the reader and writer control unit 112b Act S114).

The reader and writer control unit 112b transmits the continuous wave CW to the RFID tags T (Act S116).

If there is no abnormality in the checked result of the received error detection signal CRC 16, the reader and writer control unit 112b then transmits, in turn, an inquiry signal QueryRep to the RFID tags #2 to # n other than the RFID tag #1 (Act S118). In the example of FIG. 8, it is assumed that the RFID tag #2 receives the inquiry signal QueryRep.

Thereafter, the reader and writer control unit 112b of the RFID tag reading device 30b performs for the RFID tag #2, substantially the same series of reading acts (Acts S120 to S130) as performed between the reader and writer control unit 112b and the RFID tag #1 (Acts S106 to S116). Thereafter, the reader and writer control unit 112b then performs the same series of reading acts for each RFID tag T.

The reader and writer control unit 112b eventually transmits the inquiry signal QueryRep to the RFID tag # n, which is the last remaining unread RFID tag T (Act S132).

Subsequently, the reader and writer control unit 112b again transmits the continuous wave CW to the RFID tags T (Act S134).

If the response signal EPC to the inquiry signal QueryRep and the error detection signal CRC 16 from any remaining, unread RFID tag cannot be received before the elapse of the predetermined timeout time To, the reader and writer control unit 112b instructs the antenna movement control unit 114 to stop the movement of the RFID antenna 22 (Act S136).

The stepping motor 12 stops rotating in response to the instruction of Act S136. Then, the RFID antenna 22 stops moving (Act S137).

As described above, according to the RFID tag reading device 30, during a transmission period in which the RFID antenna 22 transmits radio waves, the moving mechanism 24 changes the communication range of the RFID antenna 22 and the RFID tag T. Then, the reader and writer control unit 112 reads the information of the RFID tag T from the commodity M to which the RFID tag T is attached. Therefore, it is possible to provide the RFID tag reading device 30 having no missing reading range coverage, which widens the reading range.

Furthermore, according to the RFID tag reading device 30, the moving mechanism 24 starts changing the communication range by the moving mechanism 24 on condition that the RFID antenna 22 starts transmitting radio waves. Therefore, since the RFID antenna 22 starts movement with the start of the transmission of radio waves, it is possible to prevent the occurrence of a missed reading range at the start of the movement of the RFID antenna 22.

Furthermore, according to the RFID tag reading device 30, the moving mechanism 24 stops changing the communication range by the moving mechanism 24 on condition that the RFID antenna 22 stops transmitting radio waves. Therefore, since the RFID antenna 22 stops movement with the stop of transmission of radio waves, it is possible to prevent the occurrence of a missing reading range upon the stopping of the movement of the RFID antenna 22.

According to the RFID tag reading device 30a, the RFID antenna 22 continuously transmits radio waves until the reader and writer control unit 112a receives the response signal EPC to the last inquiry signal QueryRep for the RFID tags T. Therefore, it is possible to shorten the radio wave transmission time while eliminating the missing reading range.

According to the RFID tag reading device 30b, the RFID antenna 22 continuously transmits radio waves until the reader and writer control unit 112b determines that the response signal EPC to the inquiry signal QueryRep for an unread RFID tag T has not been obtained before the elapsing of a predetermined time (e.g., a timeout time). Therefore, it is possible to shorten the radio wave transmission time while eliminating the missing reading range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, specific examples are described above in which a RFID tag reading device 30, 30a, or 309b is applied to a case of reading information stored in RFID tags T attached to a commodity M. However, the RFID tag reading device 30, 30a, or 30b can also be used as an RFID tag writing device that writes information into the RFID tags T. That is, after tag information is read, the RFID antenna 22 writes information into the RFID tag T indicating that the commodity has been registered. Such information written to the RFID tags T can be used not only as information indicating that the commodity is registered but also as information for crime prevention. When at least one of the RFID tag reading devices 30, 30a, and 30b are used as the RFID tag writing devices, the RFID antenna 22 is moved only while the RFID antenna 22 is transmitting radio waves, such that it is possible to reliably write information into the RFID tags T affixed to merchandise or other commodities.

What is claimed is:

1. An electronic tag reading device, comprising:
   an antenna for transmitting wireless signals to an electronic tag for reading information stored in the electronic tag;
   an electronic tag reader electrically coupled to the antenna, the electronic tag reader supplying signals to the antenna and receiving signals from the antenna for reading information stored in the electronic tag;
   a movable stage connected to the antenna and movable together with the antenna; and
   a controller configured to, upon receipt of an instruction from an external device, perform a tag reading process including
      controlling the movable stage to move toward an end of a moving path thereof and controlling the electronic tag reader to supply the signals for a first predetermined time period,
      when tag information is successfully received from an electronic tag through the electronic tag reader during the first predetermined time period, transmitting the received information to the external device, and
      upon lapse of the first predetermined time period, controlling the movable stage to stop and controlling the electronic tag reader not to supply the signals for a second predetermined time period,
      wherein the controller is configured to repeat the tag reading process if the movable stage has not reached the end of the moving path.

2. The device according to claim 1, wherein when the movable stage is being moved during the tag reading process the antenna transmits wireless signals.

3. The device according to claim 1, wherein when the movable stage is not moved the antenna does not transmit wireless signals during the tag reading process.

4. The device according to claim 1, wherein the antenna is a planar patch antenna.

5. The device according to claim 1, wherein the electronic tag is an RFID tag.

6. The device according to claim 1, wherein the antenna is physically connected to the movable stage and the movable stage includes a coaxial connector to which the electronic tag reader is connected.

7. The device according to claim 1, further comprising: a checkout counter upon which an item of merchandise, to which the electronic tag has been attached, can be placed, wherein the antenna and the movable stage are disposed underneath the checkout counter.

8. The device according to claim 7, wherein the external device is a point-of-sale terminal disposed on the checkout counter and is configured to transmit the instruction to the controller and perform, upon receipt of the tag information, registration of an item of merchandise corresponding to the tag information.

9. A sales data processing apparatus, comprising:
   an electronic tag reading area in which an item of merchandise can be placed;
   an antenna for transmitting wireless signals to the electronic tag reading area for reading information stored in an electronic tag attached to the item of merchandise;
   an electronic tag reader electrically coupled to the antenna, the electronic tag reader supplying signals to the antenna and receiving signals from the antenna for reading the information stored in the electronic tag;
   a movable stage connected to the antenna and movable together with the antenna
   a point-of-sale (POS) terminal configured to perform registration of an item of merchandise; and a controller configured to, upon receipt of an instruction from the POS terminal, perform a tag reading process including controlling the movable stage to move toward an end of a moving path thereof and controlling the electronic tag reader to supply the signals for a first predetermined time period, when tag information is successfully received from an electronic tag through the electronic tag reader during the first predetermined time period, transmitting the received information to the POS terminal, and upon lapse of the first predetermined time period, controlling the movable stage to stop and controlling the electronic tag reader not to supply the signals for a second predetermined time period, wherein the controller is configured to repeat the tag reading process if the movable stage has not reached the end of the moving path.

10. The apparatus according to claim 9, wherein when the movable stage is being moved during the tag reading process the antenna transmits wireless signals, and when the movable stage is not moved the antenna does not transmit wireless signals during the tag reading process.

11. The apparatus according to claim 9, wherein upon input through a button arranged on the POS terminal, the POS terminal transmits the instruction to the controller.

12. The apparatus according to claim 9, wherein the antenna is a planar patch antenna and the electronic tag is an RFID tag.

13. The apparatus according to claim 9, wherein the electronic tag reading area covers at least a portion of checkout counter.

14. The device according to claim 1, wherein when the movable stage has reached the end of the moving path, the controller notifies the external device of completion of the tag reading process.

15. The apparatus according to claim 9, wherein when the movable stage has reached the end of the moving path, the controller notifies the POS terminal of completion of the tag reading process.

\* \* \* \* \*